(12) United States Patent
Werner et al.

(10) Patent No.: US 12,017,300 B2
(45) Date of Patent: Jun. 25, 2024

(54) CROSS STITCHING CONTROL BY QMM3D

(71) Applicant: Concept Laser GmbH, Lichtenfels (DE)

(72) Inventors: Juergen Werner, Lichtenfels (DE); Dominic Graf, Weitramsdorf (DE); Jonathan William Ortner, Bamberg (DE); Lisa Pastuschka, Coburg (DE); Tobias Bokkes, Untersiemau (DE)

(73) Assignee: Concept Laser GmbH, Lichtenfels (DE)

( * ) Notice: Subject to any disclaimer, the term of this patent is extended or adjusted under 35 U.S.C. 154(b) by 466 days.

(21) Appl. No.: 16/816,391

(22) Filed: Mar. 12, 2020

(65) Prior Publication Data

US 2021/0283716 A1 Sep. 16, 2021

(51) Int. Cl.
| | | |
|---|---|---|
| *B23K 26/342* | (2014.01) | |
| *B22F 10/31* | (2021.01) | |
| *B23K 26/03* | (2006.01) | |
| *B23K 26/06* | (2014.01) | |
| *B23K 26/064* | (2014.01) | |
| *B23K 26/082* | (2014.01) | |
| *B33Y 10/00* | (2015.01) | |
| *B33Y 30/00* | (2015.01) | |
| *B33Y 50/00* | (2015.01) | |

(52) U.S. Cl.
CPC ............ *B23K 26/342* (2015.10); *B22F 10/31* (2021.01); *B23K 26/032* (2013.01); *B23K 26/0604* (2013.01); *B23K 26/0626* (2013.01); *B23K 26/064* (2015.10); *B23K 26/082* (2015.10); *B33Y 10/00* (2014.12); *B33Y 30/00* (2014.12); *B33Y 50/00* (2014.12)

(58) Field of Classification Search
CPC ......... B33Y 50/00; B33Y 10/00; B33Y 30/00; B23K 26/064; B23K 26/082; B23K 26/032; B23K 26/0604; B23K 26/0626; B23K 26/342; B22F 10/31; B22F 12/45; B22F 12/90; B29C 64/153; B29C 64/282; B29C 64/393
USPC ....................................................... 219/76.1
See application file for complete search history.

(56) References Cited

U.S. PATENT DOCUMENTS

| | | |
|---|---|---|
| 5,995,650 A | 11/1999 | Migdal et al. |
| 9,056,368 B2 | 6/2015 | Stork Genannt Wersborg |

(Continued)

*Primary Examiner* — Janie M Loeppke
*Assistant Examiner* — Simpson A Chen
(74) *Attorney, Agent, or Firm* — Dority & Manning, P.A.

(57) ABSTRACT

An apparatus for additively manufacturing three-dimensional objects may include at least one calibration unit, at least one irradiation device, and a determination device. The least one calibration unit may include at least one calibration region arranged in the beam guiding plane, and the at least one calibration region may include a plurality of sub-regions differing in respect of at least one optical property. The at least one irradiation device may be configured to guide a plurality of energy beams across the at least one calibration region comprising the plurality of sub-regions, and a plurality of calibration signals may be generated by the plurality of sub-regions being irradiated with the plurality of energy beams. The determination device may be configured to determine the plurality of calibration signals and to determine a calibration status of the irradiation device based at least in part on the determined plurality of calibration signals.

19 Claims, 5 Drawing Sheets

(56) References Cited

U.S. PATENT DOCUMENTS

| | | |
|---|---|---|
| 9,492,886 B2 | 11/2016 | Stork Genannt Wersborg |
| 9,925,715 B2 | 3/2018 | Cheverton et al. |
| 2017/0021454 A1 | 1/2017 | Dallarosa et al. |
| 2018/0186067 A1* | 7/2018 | Buller .................... B22F 12/90 |
| 2018/0290239 A1 | 10/2018 | Haro Gonzalez et al. |
| 2019/0039319 A1 | 2/2019 | Bechmann et al. |
| 2020/0023585 A1* | 1/2020 | Wiesner ................. B29C 64/20 |
| 2022/0193785 A1* | 6/2022 | Neumann ............ G05B 19/401 |

* cited by examiner

CROSS STITCHING CONTROL BY QMM3D

FIELD

The present disclosure generally pertains to apparatuses for additively manufacturing three-dimensional objects, and more particularly to apparatuses that include at least one irradiation device configured to guide at least two energy beams across a beam guiding plane, and related systems and methods.

BACKGROUND

Apparatuses for additively manufacturing three-dimensional objects may use two or more energy beams for selectively irradiating build material. In such apparatuses each layer of build material is usually irradiated with more than one energy beam in that the area in the corresponding layer that needs to be irradiated is subdivided and assigned to different energy beams in that each energy beam irradiates a part of the layer. Hence, the manufacturing time can be reduced correspondingly, as more than one energy beam can be used to irradiate the scan area and therefore, the scan area can be irradiated faster.

The two or more energy beams may be guided by different beam guiding units assigned to the same or different irradiation devices. The beam guiding units have to be calibrated correspondingly in order to assure that the parts of each layer that are irradiated by different energy beams fit together and that so-called "cross stitching errors" are avoided. These "cross stitching errors" can occur in areas where beam guiding planes of the different energy beams come into proximity with or are abutting one another. For example, cross stitching errors can occur at a border between adjacent beam guiding planes when the beam guiding units are not properly calibrated. This can either result in a border region that is falsely irradiated with both energy beams and/or a border region that has an unirradiated region defining a gap between corresponding beam guiding planes. Such an error in the irradiation of the corresponding part of the layer results in defects in the object, such as mechanical instability, inclusions/entrapments and the like.

Usually, the calibration process for calibrating such apparatuses is cumbersome and time-consuming, as for example test specimens are irradiated with the two or more optical systems. A first series of calibration patterns can be irradiated on a test specimen with the first beam guiding unit and the first energy beam and a second series of calibration patterns can be irradiated on the test specimen with the second beam guiding unit and the second energy beam and so on. The first series of calibration patterns and the second series of calibration patterns may be irradiated in defined calibration positions, such as in the same positions or in different positions. After the irradiation of the test specimen is complete, an evaluation of the test specimen can be performed. In some embodiments, a calibration process may include determining whether one or more calibration patterns are irradiated in the correct positions across the beam guiding plane. Usually, a coordinate measurement machine is used to determine whether each of the calibration patterns is generated in the correct position or whether a deviation of one or more calibration patterns occurred. For example, lateral shifts between the two coordinate systems of the at least two beam guiding units can be derived and corresponding adjustments can be made.

Typical processes of generating correction values involve irradiating a test specimen with the at least two beam guiding units, removing the test specimen from the apparatus, and evaluating the test specimen outside the apparatus. If a calibration of the apparatus is necessary, typically a second calibration process involving the irradiation of the test specimen and the evaluation of the irradiated calibration patterns is necessary to verify the correction values. Hence, the process of irradiating and evaluating calibration patterns is cumbersome and time-consuming. Further, typical calibration process are performed in advance to or after an additive manufacturing process, and not during an additive manufacturing process. Consequently, various influences during the additive manufacturing process cannot be taken into consideration. For example, a thermal drift or the like can influence the additive manufacturing process and therefore introduce an error in the calibration of the at least two beam guiding units.

Accordingly, there exists a need for improved apparatuses, systems, and methods for additively manufacturing three-dimensional objects, including to improve the calibration of the apparatus.

BRIEF DESCRIPTION

Aspects and advantages will be set forth in part in the following description, or may be apparent from the description, or may be learned through practicing the presently disclosed subject matter.

In one aspect, the present disclosure embraces apparatuses for additively manufacturing three-dimensional objects. An exemplary apparatus may include at least one calibration unit, at least one irradiation device, and a determination device. The least one calibration unit may include at least one calibration region arranged in the beam guiding plane, and the at least one calibration region may include a plurality of sub-regions differing in respect of at least one optical property. The at least one irradiation device may be configured to guide a plurality of energy beams across the at least one calibration region comprising the plurality of sub-regions, and a plurality of calibration signals may be generated by the plurality of sub-regions being irradiated with the plurality of energy beams. The determination device may be configured to determine the plurality of calibration signals and to determine a calibration status of the irradiation device based at least in part on the determined plurality of calibration signals.

In another aspect, the present disclosure embraces methods of calibrating an apparatus for additively manufacturing three-dimensional objects. An exemplary method may include guiding a plurality of energy beams generated by at least one irradiation device across at least one calibration unit. The at least one calibration unit may include at least one calibration region arranged in the beam guiding plane, and the at least one calibration region may include a plurality of sub-regions differing in respect of at least one optical property. An exemplary method may additionally, or alternatively include determining with a determination device, a plurality of calibration signals generated by the plurality of sub-regions being irradiated with the plurality of energy beams; and/or determining with the determination device, a calibration status of the irradiation device based at least in part on the determined plurality of calibration signals.

In another aspect, the present disclosure embraces computer-readable medium. Exemplary computer-readable medium has computer-executable instructions, which when executed by a processor associated with an apparatus for additively manufacturing three-dimensional objects, causes the apparatus to perform a method in accordance with the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
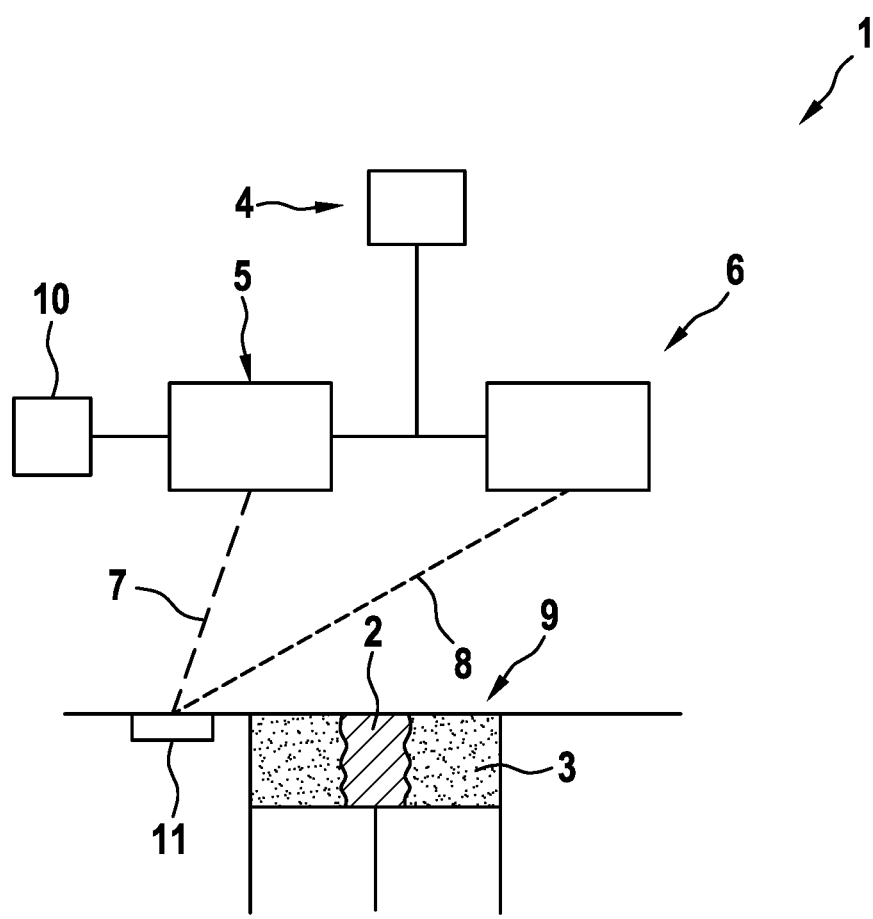
FIG. 1 shows an apparatus for additively manufacturing three-dimensional objects.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The apparatus described herein is an apparatus for additively manufacturing three-dimensional objects, e.g. technical components, by means of successive selective layerwise consolidation of layers of a powdered build material ("build material") that can be consolidated by means of an energy source, e.g. an energy beam, such as a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may include a number of functional units that are used during its operation. Exemplary functional units include a process chamber, an irradiation device configured to selectively irradiate a build material layer disposed in the process chamber with at least one energy beam, and a stream generating device configured to generate a gaseous fluid stream at least partly streaming through the process chamber with given streaming properties, e.g. a given streaming profile, streaming velocity, etc. The gaseous fluid stream is capable of being charged with non-consolidated particulate build material, such as smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The present disclosure relates to apparatuses for additively manufacturing three-dimensional objects, and related systems and methods. Exemplary apparatuses include an irradiation device that is configured to guide two or more energy beams across the beam guiding plane. For example, the irradiation device may include two beam guiding units that are assigned to the irradiation device. The respective beam guiding units may be configured to guide an energy beam independent from the at least one other energy beam across the beam guiding plane.

In accordance with the present disclosure, at least one calibration unit can be provided with at least one calibration region that is arranged in the beam guiding plane, e.g. in the plane across which the two or more energy beams can be guided. Thus, each of the at least two energy beams can be guided to the beam guiding plane and generate a spot in the beam guiding plane, e.g. configured to irradiate material arranged in the beam guiding plane.

Respective calibration regions may include at least two sub-regions that differ from one another with respect to at least one optical property. An irradiation device may be configured to guide the at least two energy beams across the calibration region and to generate a calibration signal upon irradiation of each sub-region. A determination device may be configured to determine the calibration signal generated by irradiating the at least two sub-regions with the energy beams and configured to determine the calibration status of the irradiation device based on the determined calibration signals. In some embodiments, a calibration region may include two or more sub-regions that differ in at least one optical property. The at least one optical property defines how the energy beam is received or reflected at or in the calibration region. The energy beam may be received and/or reflected differently as between the respective sub-regions depending on the optical property of the respective sub-regions. Additionally, or in the alternative, the respective sub-regions may include a material that emit radiation differently as between the respective sub-regions. Different materials can be used for the different sub-regions. Additionally, or in the alternative, a different physical, mechanical, chemical parameter can be used or selected to provide the at least two different sub-regions of the calibration region.

Due to the different optical properties of the at least two sub-regions of the calibration region, different calibration signals are generated upon irradiation with an energy beam. In some embodiments, it can be distinguished by the determination device, whether the received radiation is emitted from the first or the second sub-region of the calibration region. As the irradiation device is configured to guide both energy beams across the calibration region, the calibration signals can be generated upon irradiation of the at least two sub-regions with both energy beams.

Thus, the determination device can determine the calibration signals that are generated due to the irradiation of the at least two sub-regions of the calibration region with both energy beams. Based on the calibration signals that are generated by the at least two energy beams, a calibration status of the irradiation device can be determined.

For example, each of the energy beams can be scanned or guided across the at least two sub-regions, and upon irradiation of the two sub-regions, a characteristic calibration signal may be generated. For example, due to the characteristic optical property of each of the sub-regions, a characteristic calibration signal is generated. This can be achieved, inter alia, by using different materials for the different sub-regions or a different geometry, structure or the like. A first sub-region may be made from aluminum and a second adjacent sub-region may be made from copper, for instance. Thus, the determination device can distinguish the two calibration signals generated with the energy beam being incident on the first sub-region or the second sub-region.

Using different materials is one illustrative example of how a calibration region with two sub-regions with different optical properties can be achieved. The first sub-region may also be a region of arbitrary material or structure. The second sub-region may be a hole or a pin, i.e. having a different geometrical structure. It will be appreciated that other types of mechanical, chemical or physical parameters may be used to introduce different optical properties in the at least two sub-regions, such as surface roughness, material used, structure of the material or the like.

As the determination device can distinguish between the calibration signals generated by irradiating the first sub-region and the second sub-region, i.e. the different sub-regions, a calibration status can be determined, as the determination device can determine the actual position of the energy beam and receive or access a nominal position of the energy beam. The nominal position of the energy beam, e.g. stored in a control unit, can be compared with the calibration signal that is generated upon irradiation with the energy beam. Thus, if the energy beam should be incident on the first sub-region, which can be verified by determining the calibration signal generated, and another calibration signal is generated, e.g. as the energy beam is incident on the second sub-region, a corresponding calibration status can be determined indicating a misalignment.

The at least two energy beams may be scanned across the sub-regions, and the position or the time in which the transition between the first and the second sub-region happens may be determined based at least in part on the arrangement of the calibration region and/or the arrangement of the sub-regions of the calibration region. For example, scanning vectors of the first energy beam and the second energy beam can be compared in order to determine whether the transition from the two sub-regions happened for both energy beams at the same time or at the same position. Based on the result of this determination the corresponding calibration status can be derived and the irradiation device can be calibrated, if necessary.

The determination device may, inter alia, be arranged in line with at least one of the beam guiding units. Thus, radiation that is emitted from the beam guiding plane, e.g. from the sub-regions of the calibration region, can travel the same way back as the energy beam travels from the beam source to the beam guiding plane. The radiation emitted from the beam guiding plane, e.g. reflected or emitted in form of thermal radiation, does not travel to the beam source, but travels to the determination device, e.g. through a semi-permeable mirror.

The determination device may include a camera and/or a photo diode configured to receive the calibration signal, e.g. radiation emitted from the beam guiding plane and generate a corresponding signal or calibration data based on the received calibration signals. The coordinate systems of the at least two beam guiding units can be aligned based at least in part on the calibration data, thereby avoiding cross stitching or other errors that may otherwise be introduced due to misalignment between the beam guiding units. The optical property may also be deemed a signal property or an emission property, as the different optical properties of the at least two sub-regions have the effect that the generated calibration signals emitted from the two sub-regions differ. For example, the at least two different calibration signals may have different intensities.

According to an embodiment of the apparatus, the irradiation device may be configured to scan the at least two energy beams along a beam path across the calibration region. A first sub-path may extend through a first sub-region and a second sub-path may extend through a second sub-region. The determination device may be configured to determine a chronologically resolved and/or spatially resolved intensity signal generated by guiding the at least two energy beams along the first and second sub-path. In some embodiments, the respective energy beams may be scanned along the defined beam path that extends across the calibration region. The beam path may include a first and a second sub-path, in which the first sub-path is arranged in the first sub-region and the second sub-path is arranged in the second sub-region. The energy beam may be guided along the beam path across the first sub-region and the second sub-region and may generate corresponding calibration signals by irradiating the corresponding regions along the first sub-path and the second sub-path.

The determination device can determine the intensity signal that is generated by guiding the corresponding energy beams along the first and second sub-path and therefore determine the chronologically resolved or spatially resolved intensity signal. In some embodiments, each energy beam being scanned along the beam path generates a first calibration signal while being guided across the first sub-region and a second calibration signal while being scanned along the second sub-path across the second sub-region. The determination device can correspondingly determine the intensity signal over time or in combination with the positions the corresponding energy beam is guided along.

The determination device may further be configured to compare the calibration signals generated by guiding the at least two energy beams across the calibration region. The determination device can determine the different calibration signals that are generated by guiding the at least two energy beams across the calibration region, or more precisely across the first sub-region and the second sub-region. By comparing the calibration signals generated by the first energy beam and the second energy beam, a determination can be made as to whether the first energy beam and the second energy beam generate the same calibration signals when guided along the same nominal beam path. Such a determination can be made based at least in part on a chronologically resolved and/or spatially resolved comparison of the calibration signals generated by the first energy beam and the second energy beam. If a deviation between the two energy beams being guided along the same beam path occurs, it can be derived that one of the energy beams is not guided along the same first sub-path and the second sub-path, or that a deviation between the two beam paths occurred. Therefore, it can be derived that the starting points of the beam paths for the first and the second energy beam deviate and therefore, a cross stitching error may be present.

The determination device can further be configured to generate calibration data based on the ratio of the calibration signals that are generated by irradiating the different sub-regions. In some embodiments, a defined nominal ratio of the calibration signals can be expected depending on the arrangement of the beam path across the calibration region. For example, if the lengths of the first sub-path and the second sub-path match, an equal ratio of the first calibration signal and the second calibration signal is to be expected. If one of the calibration signals generated by scanning the energy beam across the calibration region deviates from the defined ratio, a misalignment of the coordinate system of the corresponding beam guiding unit can be derived. The irradiation device may be calibrated based at least in part on the calibration data such that each energy beam is guided along the beam path in correct alignment to the calibration region. When guided across the calibration region, the calibrated energy beams may respectively generate a defined ratio of the sub-parts of the calibration signal. The first sub-part of the calibration signal may be generated by scanning an energy beam along the first sub-path across the first sub-region and/or the second sub-part of the calibration signal may be generated by scanning an energy beam along the second sub-path across the second sub-region.

In some embodiments, an absolute calibration may be performed upon the energy beams when being guided across the calibration region. Additionally, or in the alternative, a relative calibration may be performed between the coordinate systems of the beam guiding units.

In general, the two sub-regions may be arbitrarily arranged in the beam guiding plane as long as the energy beams can be properly guided across the two sub-regions of the calibration region. In some embodiments, the at least two sub-regions of the calibration region can be arranged in the beam guiding plane directly adjacent to one another, such as with a common edge or border. In some embodiments, the energy beams being guided across the calibration region are guided directly across a common edge or border and therefore, are guided from the first sub-region directly into the second sub-region. The transition from the first sub-region into the second sub-region is therefore a sharp change in the signal and can therefore, properly be determined by the determination device.

The calibration region can be arranged in a defined position in the beam guiding plane, such as in the build plane and/or adjacent to the build plane. By arranging the calibration region in a well-defined position in the beam guiding plane, e.g. in a process chamber of an additive manufacturing apparatus, allows for generating the calibration signals with respect to a coordinate system of the apparatus. In some embodiments, a chronologically resolved or spatially resolved calibration signal may be used to determine when and where the energy beam is guided across the first sub-region and the second sub-region. As the position of the calibration region is well-defined with respect to the coordinate system of the apparatus, an absolute calibration of the beam guiding units can be performed. In some embodiments, a coordinate system of a beam guiding units can be referenced to a coordinate system of an apparatus. Such a calibration unit that can be arranged in a defined position inside the apparatus can be a prefabricated unit, such as a prefabricated unit that can be attached to a corresponding receptacle within the beam guiding plane provided by the apparatus.

For example, the calibration unit can be attached to a corresponding receptacle in the process chamber prior to an additive manufacturing process or prior to a calibration process. The receptacle can be arranged in a process plane of the apparatus or arranged on or in a component of the apparatus, such as on top of a re-coater, a build material supply, or the like.

Additionally or alternatively, the irradiation device may be configured to generate the at least one calibration region during an additive manufacturing process, such as by irradiating the at least two sub-regions in the build plane with different irradiation parameters, especially by irradiating only one sub-region and leaving the other sub-region non-consolidated or non-irradiated. By generating the calibration region with the irradiation device, e.g. by irradiating a part of the beam guiding plane with the energy beam guided by one of the beam guiding units, a calibration region can be additively manufactured during the additive manufacturing process. For example, the calibration region may be irradiated in that the two sub-regions of the calibration region can be irradiated with different irradiation parameters, thereby influencing the optical property of the two sub-regions. As one of the beam guiding units of the irradiation device generates the calibration region, a relative calibration can be performed in which the coordinate systems of the at least two different beam guiding units can be aligned. For example, one of the beam guiding units may be used to irradiate the calibration region, and thereafter, the first and the at least one second energy beam may be guided across the generated calibration region in order to generate the calibration signals in the respective first and second sub-region of the calibration region.

According to another embodiment, at least two different calibration units and/or at least two different calibration regions can be arranged in at least two different positions in the beam guiding plane. Thus, the calibration process can be performed for different positions in the beam guiding plane, e.g. in order to determine other types of misalignments or errors of the beam guiding units, such as rotational errors, distortions or the like between the two beam guiding units.

At least one calibration unit may have at least two sub-regions arranged in different directions. For example, at least two sub-regions that are adjacent to one another may be arranged perpendicular to one another. This exemplary arrangement of sub-regions of the calibration units allows for guiding the energy beams in different directions across the sub-regions, e.g. in x-direction and y-direction, with the two different directions being arranged perpendicular to one another. In some embodiments, the alignment of the coordinate systems can be determined along two different axes of the coordinate systems of the beam guiding units. For example, one calibration unit may have at least four sub-regions arranged in a checkerboard pattern. Thus, at least two groups of sub-regions with defined optical properties may be arranged in a checkerboard pattern, e.g. arranged like the black and white squares on a checkerboard.

According to another embodiment, at least one sub-region may be shaped as defined geometric figure or pattern, such as a circle or a triangle or a rectangle. The at least one sub-region may be at least partially encompassed or surrounded by the at least one other sub-region. Thus, a defined pattern or geometrically shaped area can be applied on or surrounded by another sub-region. In some embodiments, the corresponding calibration signals may be generated by guiding the energy beams across the calibration unit, and the alignment of the coordinate systems of the beam guiding units can be determined based at least in part on the defined pattern or geometric figure.

The at least two energy beams can be guided arbitrarily with respect to the calibration unit. In some embodiments, the at least two energy beams may be guided along a beam path that includes at least one component perpendicular or parallel to a transition or border between the at least two sub-regions. In some embodiments, the arrangement of the beam path with respect to the arrangement of the calibration region, such as the border between the at least two sub-regions, can be selected arbitrarily. For example, an arrangement may be perpendicular or parallel to the transition, e.g. the border, between the two sub-regions. In some embodiments, the energy beams can be scanned perpendicular to the transition or border between the at least two sub-regions or parallel to the transition or border. For example, the respective energy beams may be scanned along a plurality of beam paths, such as a plurality of beam paths arranged in parallel to one other. It will be appreciated that a parallel or perpendicular arrangement, or any other arrangement, may be selected for the plurality of beam paths, e.g., with respect to the border.

Choosing the arrangement of the beam paths perpendicular to the transition or border between the at least two sub-regions allows for determining the calibration status with respect to the resolution of the determination device, as detection of the transition or border between the at least two sub-region depends at least in part on the resolution, e.g. the spatial or time resolution of the detector. By arranging the beam paths in parallel to the transition between the at least two sub-regions the resolution depends on the distance between the two beam paths neighboring the transition or border between the two sub-regions. Additionally, or in the alternative, the two energy beams may be scanned along beam paths that are respectively perpendicular and parallel to the transition across the at least two sub-regions.

According to another embodiment, the irradiation device may be configured to scan the at least two energy beams across a scan area. Thus, in addition to or as an alternative to scanning the energy beams along a one-dimensional beam path across the calibration region, the beam paths may be combined such that a two-dimensional area is scanned by the at least two energy beams. Different portions of the two-dimensional area may be configured to provide providing respectively different calibration signals, such as calibration signals with different intensities. The respectively different calibration signals may be used, for example, to determine which part of the scanned area corresponds to the first sub-region and/or the second sub-region.

As discussed above, the at least two sub-regions of the at least one calibration region may differ in at least one optical property. The difference in the optical property can be achieved by different optical parameters, such as different reflectivity coefficients and/or different absorption coefficients. Additionally, or in the alternative, the difference in the optical property can be achieved by at least one material parameter that differs as between the two sub-regions, such as a difference in the geometry and/or the material and/or the structure of the at least two sub-regions. For example, the material property may relate to the geometry, such as a pin, hole, step or a surface finish that is different as between the at least two sub-regions.

As discussed above, different materials may be used, e.g., for one of the at least two sub-regions steel or aluminum and for the other sub-region copper can be used. Additionally, or in the alternative, different material structures may be used. For example, consolidated and non-consolidated build material may provide different material structures, such as a transition between the powder bed and an additively manufactured object. The difference in the optical property of the at least two sub-regions lead to a different reflectivity and/or absorption behavior and therefore, of a different intensities of the corresponding calibration signal generated by irradiating the different sub-regions with an energy beam.

In another aspect, the present disclosure relates to systems and methods for calibrating an apparatus for additively manufacturing three-dimensional objects. The apparatus may include at least one irradiation device configured to guide at least two energy beams across a beam guiding plane. Exemplary systems and methods may be configured for: guiding at least two energy beams across at least one calibration region arranged in the beam guiding plane, in which the calibration region has at least two sub-regions that differ from one another in respect of at least one optical property; and generating a calibration signal upon irradiation of each sub-region and determining the calibration signal generated by irradiating the at least two sub-regions with the energy beams; and determining a calibration status of the irradiation device based at least in part on the determined calibration signals.

It will be appreciated that all details, features and advantages described with respect to the presently discloses apparatuses are fully transferable in whole or in part to the presently disclosed systems and methods. Exemplary embodiments of the apparatus may be configured to perform the presently disclosed methods and to operate in connection with the presently disclosed systems.

Exemplary embodiments of the present disclosure will now be described in further detail. FIG. 1 shows an apparatus 1 for additively manufacturing three-dimensional objects 2 by selectively consolidating a build material 3, e.g. a powdery metal build material. Thus, the object 2 can be layerwise built in an additive manufacturing process. For consolidating the build material 3, the apparatus 1 may include an irradiation device 4 that has a plurality of beam guiding units respectively configured to guide an energy beam across a beam guiding plane. For example, an apparatus 1 may include as a first beam guiding unit 5 configured to guide a first energy beam 7 across a beam guiding plane 9, and a second beam guiding unit 6 configured to guide a second energy beam 8 across the beam guiding plane 9.

In the embodiment shown, the irradiation device 4 includes a first beam guiding unit 5 and a second beam guiding unit 6. In other embodiments, the irradiation device 4 may include any desired number of beam guiding units, such as four beam guiding units. The first beam guiding unit 5 is configured to guide the first energy beam 7 independent from the second energy beam 8 that is guided by the second beam guiding unit 6. The beam guiding plane 9 can be subdivided to be irradiated selectively by the first energy beam 7 and the second energy beam 8. Different areas can be assigned to the first energy beam 7 and the second energy beam 8 based at least in part on the pattern that is to be irradiated. In some embodiments, the overall manufacturing time can be reduced compared to an irradiation device 4 with one energy beam.

The apparatus 1 may include a determination device 10 assigned to the first beam guiding unit 5 and/or to the second beam guiding unit 6. Additionally, or in the alternative, a first determination devices 10 may be assigned to the first beam guiding unit 5, and a second determination device 10 may be assigned to the second beam guiding unit 6. By way of example, an exemplary determination device 10 may be arranged in line with the first beam guiding unit 5 such that radiation emitted from the beam guiding plane 9 can travel the optical path that is used by the first energy beam 7 to a detector of the determination device 10. Additionally, or in the alternative, the determination device 10 may be configured to monitor the beam guiding plane 9 directly.

Figure 2:
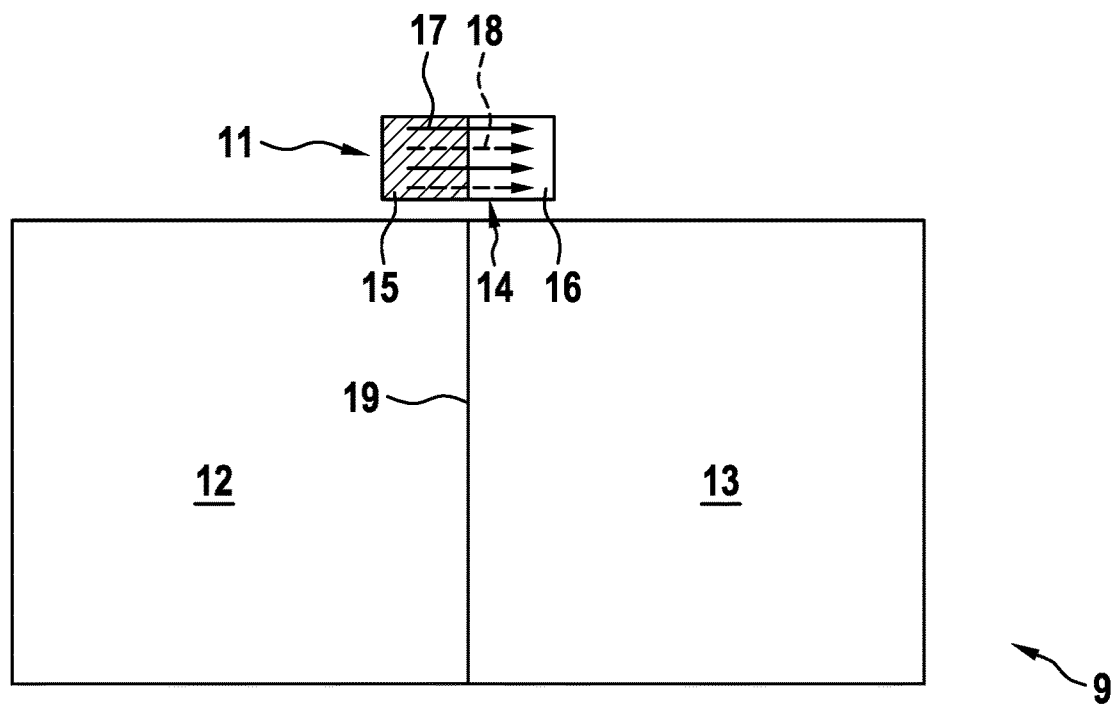
FIG. 2 shows a beam guiding plane of the apparatus of FIG. 1 with a calibration unit according to a first embodiment.

The apparatus 1 may include one or more calibration units 11 that are arranged in the beam guiding plane 9. As described with respect to FIGS. 2-5 below, the apparatus 1 can be calibrated using the calibration unit 11. For example, the apparatus 1 can be calibrated such that the coordinate systems of the respective beam guiding units 5, 6 can be aligned. FIG. 2 shows a top view on the beam guiding plane 9 of the apparatus 1 depicted in FIG. 1. Part of the beam guiding plane 9, such as the build plane in which build material 3 is arranged, can be subdivided into a plurality of scan fields, such as a first scan field 12 and a second scan field 13. The first beam guiding unit 5 and the corresponding first energy beam 7, and/or the second beam guiding unit 6 and the corresponding second energy beam 8, may be assigned to respective portions of the beam guiding plane 9 based at least in part on the position of the areas in the beam guiding plane 9 that are to be irradiated. For example, areas arranged in the first scan field 12 can be assigned to the first beam guiding unit 5 and the corresponding first energy beam 7, and/or areas in the second scan field 13 can be assigned to the second beam guiding unit 6 and the corresponding second energy beam 8.

Referring to FIG. 2, a calibration unit 11 may include a calibration region 14 that has a plurality of sub-regions, such as a first sub-region 15 and a second sub-region 16. The first sub-region 15 and the second sub-region 16 may include different optical properties such that different calibration signals may be generated upon irradiation with the first energy beam and/or the second energy beam 8. Additionally, or in the alternative, different calibration signals may be generated by the first sub-region 15 and the second sub-region 16 upon irradiation with different intensities, with the different calibration signals attributable at least in part to different optical properties of the first sub-region 15 and the second sub-region 16. For example, the ratio of radiation that is reflected at the first sub-region 15 and the second sub-region 16 may differ such that the determination device 10 receives different calibration signals depending upon whether the first sub-region 15 and/or the second sub-region 16 are irradiated.

In order to calibrate the irradiation device 4, the first beam guiding unit 5 guides the first energy beam 7, and the second beam guiding unit 6 guide the second energy beams 8, across the calibration region 14 as respectively indicated by arrows 17, 18. The beam paths along which the energy beam 7, 8 are guided may extend perpendicular with respect to a border 19 between the first and second sub-regions 15, 16. In this embodiment, the arrangement of the calibration unit 11 is well-defined with respect to the beam guiding plane 9 inside the apparatus 1. Thus, the border 19 between the first and second sub-regions 15, 16 resembles the nominal border between the first and second scan fields 12, 13. As shown in FIG. 2, a properly calibrated irradiation device 4 may have a first scan field 12 and a second scan field 13 abutting one another, such as without an overlap or gap disposed between the first scan field 12 and the second scan field 13.

Figure 3:
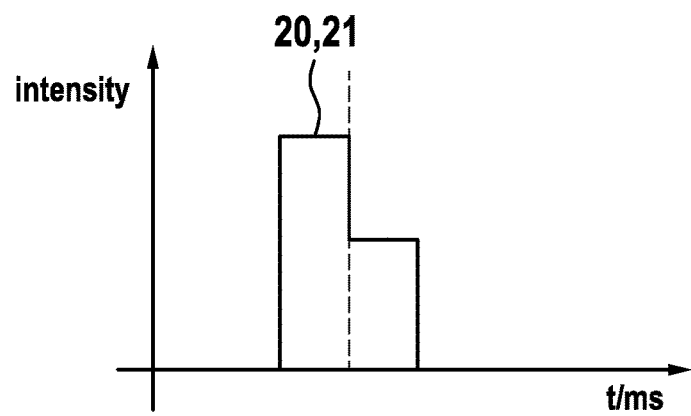
FIG. 3 shows determined calibration signals according to FIG. 2.

By scanning the first energy beam 7 and the second energy beam 8 along the respective beam paths across the calibration region 14, a first calibration signal 20 corresponding to the first energy beam 7 and a second calibration signal 21 corresponding to the second energy beam are generated, as schematically depicted in FIG. 3. As shown, the first and second calibration signals 20, 21 match one another, indicating proper alignment of the coordinate systems of the first and second scan fields 12, 13 and/or the first and second beam guiding units 5, 6. For example, the first sub-region 15 may have a reflectivity that differs from that of the second sub-region 16, such that the intensity of the first calibration signal 20 changes as the first energy beam 7 and/or the second energy beam 8 are scanned across the border 19. In an exemplary embodiment, the first sub-region 15 may have a reflectivity that is higher than that of the second sub-region 16, such that the intensity of the first calibration signal 20 changes (e.g., increases or decreases) to a different (e.g., higher or lower) intensity value as the first energy beam 7 is scanned across the border 19 and/or the intensity of the second calibration signal 21 changes (e.g., increases or decreases) to a different (e.g., higher or lower) intensity value as the second energy beam 8 is scanned across the border 19. The determination device 10 is therefore, configured to spatially and chronologically resolve the generation of the first and second calibration signals 20, 21 and therefore, evaluate, whether the first energy beam 7 and/or the second energy beam 8 are properly scanned along the respective beam paths, or whether there exists a misalignment in the coordinate systems of the first beam guiding unit 5 and/or the second beam guiding unit 6. In the example that is depicted in FIGS. 2, 3, both coordinate systems are aligned and therefore, a calibration is not necessary.

Figure 4:
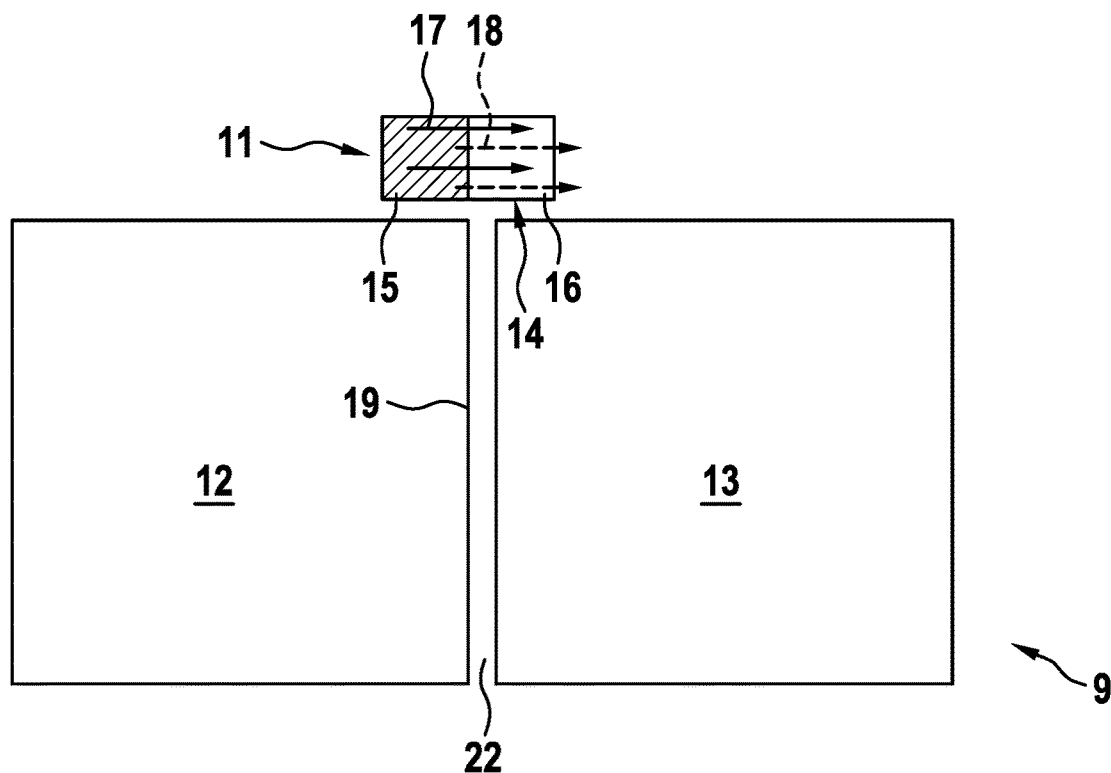
FIG. 4 shows a beam guiding plane of the apparatus of FIG. 1 with a calibration unit according to the first embodiment.
Figure 5:
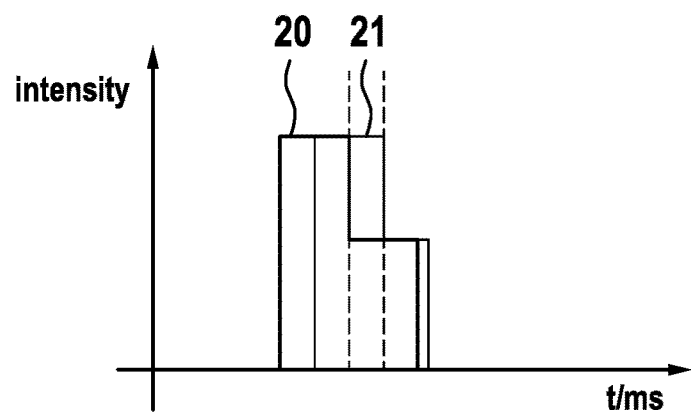
FIG. 5 shows determined calibration signals according to FIG. 4.

FIGS. 4, 5 depict an exemplary misalignment between the coordinate systems of the first and second beam guiding units 5, 6. As shown in FIG. 4, the second scan field 13 may not be directly abutting the first scan field 12, but instead, a gap 22 may be present between the first and second scan fields 12, 13. The gap 22 may be caused at least in part by a misalignment of the coordinate systems. Such a misalignment may cause irradiation errors in the additive manufacturing process. For example, to the misalignment of the second scan field 13, namely the displacement of the second scan field 13 (in the depicted beam guiding plane 9 to the right), the beam paths of the first and/or second energy beams 7, 8 may respectively start not at the edge of the first and/or second sub-regions 15, 16, but accordingly displaced (e.g., to the right). Thus, the first and second calibration signals 20, 21 that are depicted in FIG. 5, also show a displacement in the signal drop indicating the border 19. Because a signal drop is present at the border 19, a determination can be made as to whether the beam path of the first energy beam 7 and/or the second energy beam 8 is properly aligned with the calibration unit 11 based at least in part on the signal drop of the respective energy beam. For example, a determination can be made as to whether the first and second scan fields 12, 13 abut one another and/or whether the first and second scan fields 12, 13 have a gap 22 between them.

The determination device 10 is configured to generate calibration data based on the first and second calibration signals 20, 21. The calibration data can be used to adjust the alignment of first scan field 12 and/or the second scan field 13, for example, with the first and second scan fields 12, 13 abutting one another at the border 19. After an adjustment of the first beam guiding unit 5 and/or the second beam guiding unit 6, the first energy beam 7 and/or the second energy beam 8 can again be scanned across the calibration region 14 to verify the adjustments. The arrangement of the calibration unit 11 can be arbitrarily changed, e.g. turned by 90 degrees or any other desired direction.

Figure 6:
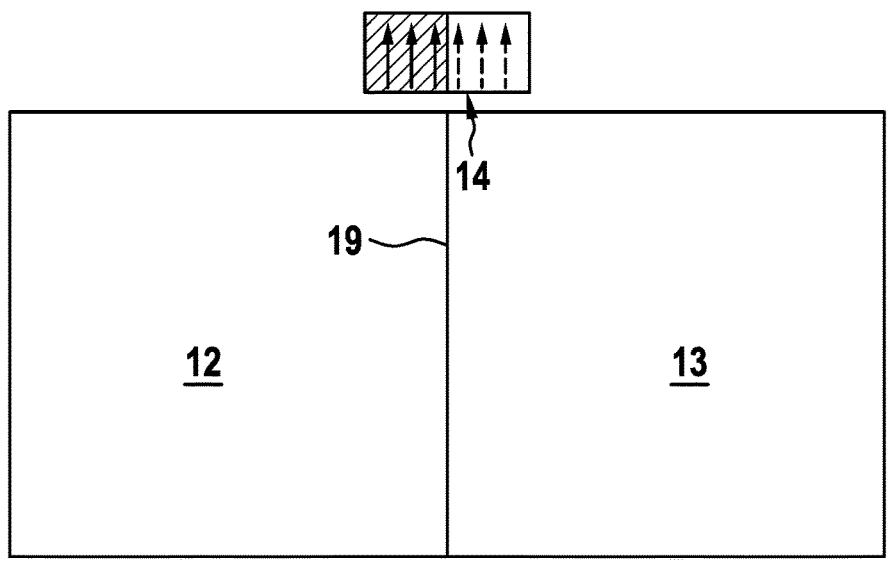
FIG. 6 shows a beam guiding plane of the apparatus of FIG. 1 with a calibration unit according to a second embodiment.

In some embodiments, the calibration region 14 may be scanned in a direction other than perpendicular to the board 19. For example, as shown in FIG. 6, the calibration region 14 may be scanned parallel to the border 19. In some embodiments, the resolution of the first calibration signal 20 and/or the second calibration signal 21 can be changed based at least in part on the scan direction along which the corresponding energy beam 7 and/or the second energy beam 8 are scanned across the calibration region 14. For example, with a perpendicular scan direction such as depicted in FIG. 2, the first calibration signal 20 and/or the second calibration signal 21 can be determined with a resolution that depends on the determination device 10, such as a resolution that depends on the refresh rate of the detector of the determination device. Additionally, or in the alternative, with a parallel scan direction such as depicted in FIG. 6, the first calibration signal 20 and/or the second calibration signal 21 can be determined with a resolution that depends on a distance between the respective beam paths of the first energy beam 7 and the second energy beam 8.

Figure 7:
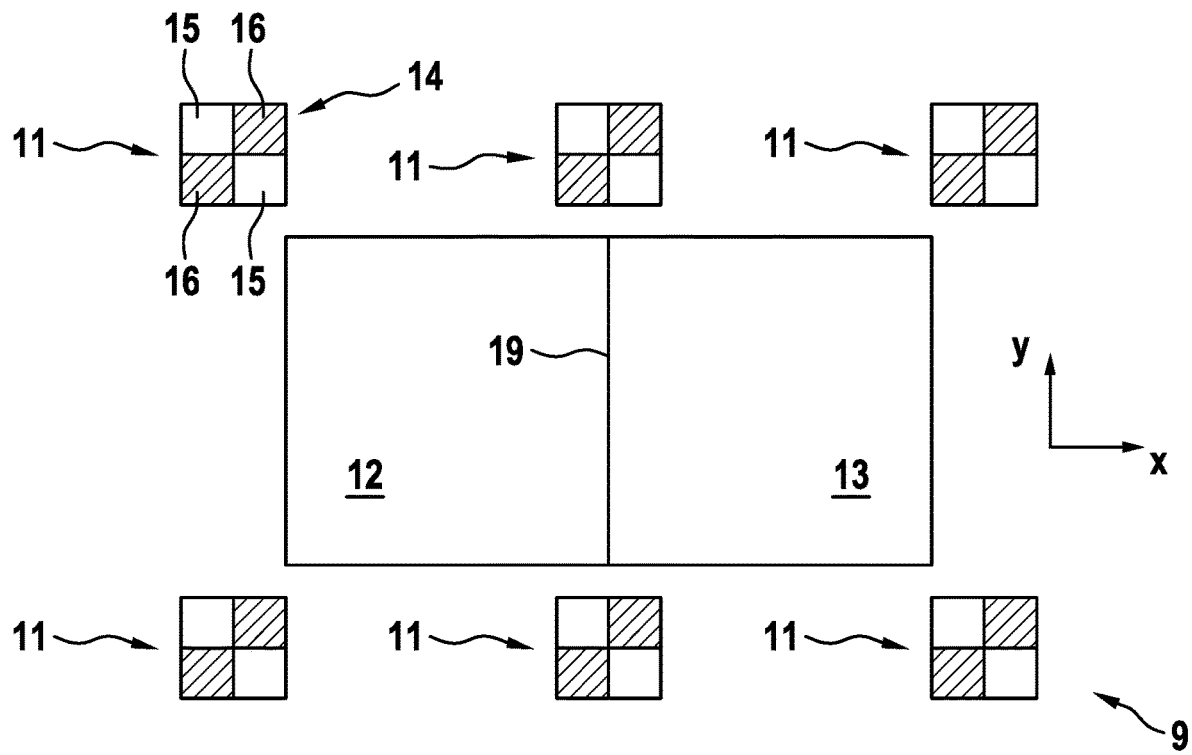
FIG. 7 shows a beam guiding plane of the apparatus of FIG. 1 with a calibration unit according to a third embodiment.

FIG. 7 shows a beam guiding plane 9 according to a third exemplary embodiment. As shown, a plurality of different calibration units 11 (e.g., six calibration units 11) may be arranged at different positions of the beam guiding plane 9. Respective ones of the calibration units 11 may have a calibration region 14 that includes a plurality of first sub-regions 15 (e.g., two first sub-regions 15) and a plurality of second sub-regions 16 (e.g., two second sub-regions 16) arranged in a pattern (e.g., a checkerboard pattern). In some embodiments, the first energy beam 7 and/or the second energy beam 8 may be scanned across the calibration unit 14 in both parallel and perpendicular directions with respect to the border 19 between the first and second scan fields 12, 13.

Thus, the alignment of the first and second scan fields 12, 13 can be verified in both the x- and y-direction. By providing different calibration units 11 in different positions in the beam guiding plane 9, various different alignment errors may be determined, such as displacements along one or more axes (e.g., x and y axes), rotational errors, distortional errors, and the like.

Figure 8:
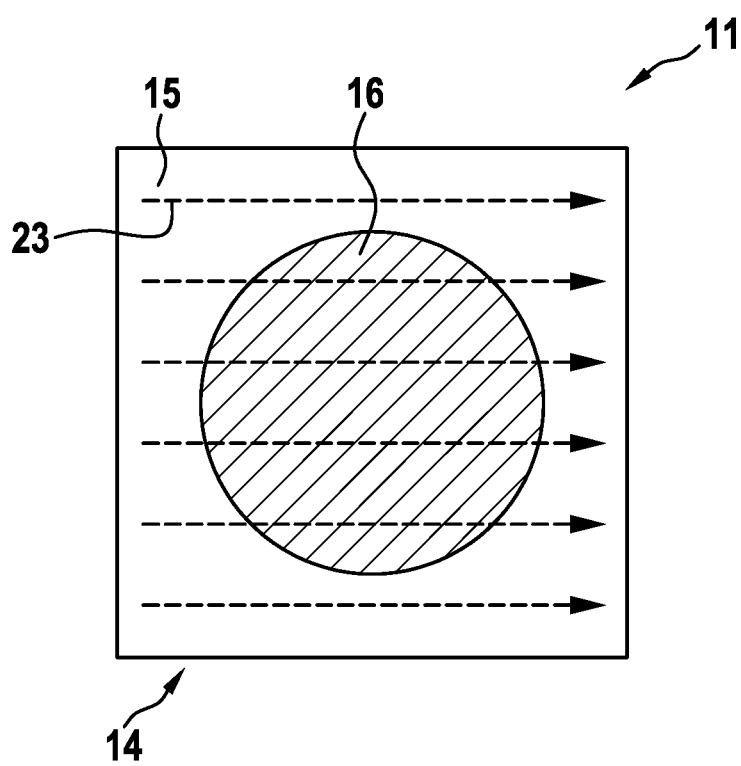
FIG. 8 shows a beam guiding plane of the apparatus of FIG. 1 with a calibration unit according to a fourth embodiment.

FIG. 8 shows another exemplary calibration unit 11, in which the calibration unit 11 includes a calibration region 14 with a first sub-region 15 and a second sub-region 16. The first sub-region 15 may include and/or surround at least a portion of the second sub-region 16. The first sub-region 15 may have a first geometrical shape and the second sub-region 16 may have a second geometrical shape. For example, the first sub-region 15 may have a polygonal shape, such as a quadrilateral, rectangular, or square shape, and/or the second sub-region 16 may have a curved shape, such as a circular or elliptical shape. In an exemplary embodiment, the first sub-region 15 may have a square shape and the second sub-region 16 may have a circular shape. In some embodiments, all or a portion of an area may be scanned by combining the respective beam paths of the first energy beam 7 and the second energy beam 8 along respective beam paths 23.

The first calibration signal 20 and the second calibration signal 21 may be used to determine whether a first coordinate system of the first sub-region 15 match or differ from a second coordinate system of the second sub-region 16. Additionally, or in the alternative, the first calibration signal 20 and the second calibration signal 21 may be used to determine whether a first point within the first coordinate system of the first sub-region 15 matches or differs from a second point within the second coordinate system of the second sub-region 16. By way of example, the first calibration signal 20 and the second calibration signal 21 may be used to determine whether the center of the first sub-region 15 (e.g., the center of a square shaped sub-region) matches or differs from the center of the second sub-region 16 (e.g., the center of a circle shaped sub-region). A determination can be made as to whether the first beam guiding unit 5 and/or the second beam guiding unit 6 are properly calibrated based at least in part on whether the first coordinate system of the first sub-region 15 sufficiently matches the second coordinate system of the second sub-region 16, and/or whether a first point within the first coordinate system of the first sub-region 15 sufficiently matches a second point within the second coordinate system of the second sub-region 16. For example, a determination can be made as to whether the first coordinate system of the first beam guiding unit 5 (or one or more first points therein) properly align with the second coordinate system of the second beam guiding unit 6 (or one or more second points therein).

It will be appreciated that all details, features and advantages that are described with respect to exemplary embodiments can be combined, exchanged, and transferred with the details, features and advantages of respective exemplary embodiments. For example, different calibration units 11 and different scan directions may be utilized interchangeably from among the exemplary embodiments.

Further aspects of the present disclosure are provided by the subject matter of the following clauses:

1. An apparatus (1) for additively manufacturing three-dimensional objects (2), wherein the apparatus (1) comprises: at least one calibration unit (11), the at least one calibration unit (11) comprising at least one calibration region (14) arranged in the beam guiding plane (9), wherein the at least one calibration region (14)

comprises a plurality of sub-regions (15, 16) differing in respect of at least one optical property; and at least one irradiation device (4) configured to guide a plurality of energy beams (7, 8) across the at least one calibration region (14) comprising the plurality of sub-regions (15, 16), wherein a plurality of calibration signals (20, 21) are generated by the plurality of sub-regions (15, 16) being irradiated with the plurality of energy beams (7, 8); and a determination device (10) configured to determine the plurality of calibration signals (20, 21) and to determine a calibration status of the irradiation device (4) based at least in part on the determined plurality of calibration signals (20, 21).

2. The apparatus of any preceding clause, wherein the plurality of energy beams (7, 8) comprises a first energy beam (7) and a second energy beam (8), and wherein the plurality of sub-regions (15, 16) comprises a first sub-region (15) and a second sub-region (16), and wherein the plurality of calibration signals comprises a first calibration signal (20) and a second calibration signal (21); wherein the irradiation device (4) is configured to scan the first energy beam (7) across a first beam path (17) comprising a first sub-path in the first sub-region (15), generating the first calibration signal (20), and to scan the second energy beam (8) along a second beam path (18) comprising a second sub-path in the second sub-region (16), generating the second calibration signal (21); and wherein the determination device (10) is configured to determine the first calibration signal (20) and the second calibration signal (21), wherein the first calibration signal (20) comprises a first intensity signal and the second calibration signal (21) comprises a second intensity signal.

3. The apparatus of any preceding clause, wherein the first calibration signal (20) and/or the second calibration signal (21) are chronologically resolved and/or spatially resolved.

4. The apparatus of any preceding clause, wherein the determination device (10) is configured to compare the first calibration signal (20) to the second calibration signal (21).

5. The apparatus of any preceding clause, wherein the determination device (10) is configured to generate calibration data based at least in part on a ratio of the first calibration signal (20) to the second calibration signal (21).

6. The apparatus of any preceding clause, wherein the first of sub-region (15) is situated adjacent to the second sub-region (16), in particular wherein the first of sub-region (15) and the second sub-region (16) share a common edge or border (19) in the beam guiding plane (9).

7. The apparatus of any preceding clause, wherein the at least one calibration region (14) is arranged in a defined position in the beam guiding plane (9), in particular in the build plane or adjacent to the build plane.

8. The apparatus of any preceding clause, wherein the irradiation device (4) is configured to generate the at least one calibration region (14) during an additive manufacturing process, in particular by irradiating the plurality of sub-regions (15, 16) in the build plane with different irradiation parameters.

9. The apparatus of any preceding clause, comprising: a plurality of calibration units (11) and/or a plurality of calibration regions (14) arranged in a plurality of respective positions in the beam guiding plane (9).

10. The apparatus of any preceding clause, wherein adjacent ones of the plurality of sub-regions (15, 16) are arranged in different, in particular perpendicular, directions relative to one another.

11. The apparatus of any preceding clause, wherein the plurality of sub-regions (15, 16) comprises at least four sub-regions (15, 16) arranged in a pattern, in particular a checkerboard pattern.

12. The apparatus of any preceding clause, wherein at least one of the plurality of sub-regions (15, 16) is shaped as a defined geometric figure or pattern, in particular a polygonal shape or a curved shape, in particular a circle or a triangle or a rectangle.

13. The apparatus of any preceding clause, wherein at least one of the plurality of sub-regions (15, 16) is at least partially encompassed or surrounded by at least another one of the plurality of sub-regions (15, 16).

14. The apparatus of any preceding clause, wherein the irradiation device (4) is configured to guide the plurality of energy beams (7, 8) along a corresponding plurality of beam paths (17, 18), wherein the plurality of beam paths (17, 18) comprise at least one component perpendicular or parallel to a transition or border (19) between respective ones of the plurality of sub-regions (15, 16).

15. The apparatus of any preceding clause, wherein the plurality of sub-regions (15, 16) differ in respect of an optical parameter, in particular a reflectivity coefficient and/or an absorption coefficient, and/or in at least one material parameter, in particular a geometric parameter and/or a material parameter and/or a structural parameter.

16. A method of calibrating an apparatus (1) for additively manufacturing three-dimensional objects (2), the method comprising: guiding a plurality of energy beams (7, 8) generated by at least one irradiation device (4) across at least one calibration unit (11), the at least one calibration unit (11) comprising at least one calibration region (14) arranged in the beam guiding plane (9), wherein the at least one calibration region (14) comprises a plurality of sub-regions (15, 16) differing in respect of at least one optical property; determining with a determination device (10), a plurality of calibration signals (20, 21) generated by the plurality of sub-regions (15, 16) being irradiated with the plurality of energy beams (7, 8); and determining with the determination device (10), a calibration status of the irradiation device (4) based at least in part on the determined plurality of calibration signals (20, 21).

17. The method of any preceding clause, comprising: calibrating the apparatus (1) based at least in part on the determined calibration status.

18. The method of any preceding clause, wherein the plurality of energy beams (7, 8) comprises a first energy beam (7) and a second energy beam (8), and wherein the plurality of sub-regions (15, 16) comprises a first sub-region (15) and a second sub-region (16), and wherein the plurality of calibration signals comprises a first calibration signal (20) and a second calibration signal (21); and wherein the method comprises: scanning the first energy beam (7) across a first beam path (17) comprising a first sub-path in the first sub-region (15), generating the first calibration signal (20), and scanning the second energy beam (8) along a second beam path (18) comprising a second sub-path in the second sub-region (16), generating the second calibration signal (21); and determining the first calibration signal (20) and the second calibration signal (21), wherein the first calibration signal (20) comprises a first intensity signal and the second calibration signal (21) comprises a second intensity signal.

19. The method of any preceding clause, comprising: chronologically resolving and/or spatially resolving the first calibration signal (20) and/or the second calibration signal (21).

20. The method of any preceding clause, comprising: comparing the first calibration signal (20) to the second calibration signal (21).

21. The method of any preceding clause, wherein the method is performed using the apparatus (1) of any preceding clause.

22. A computer-readable medium comprising computer-executable instructions, which when executed by a processor associated with an apparatus for additively manufacturing three-dimensional objects (2), causes the apparatus (1) to perform a method comprising: guiding a plurality of energy beams (7, 8) generated by at least one irradiation device (4) across at least one calibration unit (11), the at least one calibration unit (11) comprising at least one calibration region (14) arranged in the beam guiding plane (9), wherein the at least one calibration region (14) comprises a plurality of sub-regions (15, 16) differing in respect of at least one optical property; determining with a determination device (10), a plurality of calibration signals (20, 21) generated by the plurality of sub-regions (15, 16) being irradiated with the plurality of energy beams (7, 8); and determining with the determination device (10), a calibration status of the irradiation device (4) based at least in part on the determined plurality of calibration signals (20, 21).

23. The computer-readable medium of any preceding clause, comprising computer-executable instructions configured to cause an apparatus (1) to perform the method of any preceding clause.

24. The computer-readable medium of any preceding clause, wherein the apparatus (1) comprises the apparatus (1) of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for additively manufacturing three-dimensional objects, wherein the apparatus comprises:
    at least one calibration unit, the at least one calibration unit comprising at least one calibration region arranged in a beam guiding plane, wherein the at least one calibration region comprises a plurality of sub-regions differing in respect of at least one optical property;
    at least one irradiation device configured to guide a plurality of energy beams across the at least one calibration region comprising the plurality of sub-regions, wherein a plurality of calibration signals are generated by the plurality of sub-regions being irradiated with the plurality of energy beams; and
    a determination device configured to determine the plurality of calibration signals and to determine a calibration status of the irradiation device based at least in part on the determined plurality of calibration signals, wherein the plurality of energy beams comprises a first energy beam and a second energy beam, and wherein the plurality of sub-regions comprises a first sub-region and a second sub-region wherein a border defines a transition between the first sub-region and the second sub-region, and wherein the plurality of calibration signals comprises a first calibration signal, a second calibration signal, a third calibration signal, and a fourth calibration signal; and
    wherein the irradiation device is configured to scan the first energy beam across a first beam path in the first sub-region and across the border to the second sub-region, generating the first calibration signal corresponding to the first energy beam scanning the first sub-region and generating the second calibration signal corresponding to the first energy beam scanning the second sub-region, and to scan the second energy beam along a second beam path in the first sub-region and across the border to the second sub-region, generating the third calibration signal corresponding to the second energy beam scanning the first sub-region and generating the fourth calibration signal corresponding to the second energy beam scanning the second sub-region;
    wherein the determination device, based on the first, second, third, and fourth calibration signals, generates a first calibration data based on a ratio of the first calibration signal to the second calibration signal, generates a second calibration data based on a ratio of the third calibration signal to the fourth calibration signal, and compares the first calibration data to the second calibration data to determine the calibration status.

2. The apparatus of claim 1, wherein the first calibration signal comprises a first intensity signal and the second calibration signal comprises a second intensity signal.

3. The apparatus of claim 1, wherein the first calibration signal and/or the second calibration signal are chronologically resolved and/or spatially resolved.

4. The apparatus of claim 1, wherein the first sub-region is situated adjacent to the second sub-region.

5. The apparatus of claim 1, wherein the at least one calibration region is arranged in a defined position in the beam guiding plane.

6. The apparatus of claim 1, wherein the irradiation device is configured to generate the at least one calibration region during an additive manufacturing process.

7. The apparatus of claim 1, comprising: a plurality of calibration units and/or a plurality of calibration regions arranged in a plurality of respective positions in the beam guiding plane.

8. The apparatus of claim 1, wherein adjacent ones of the plurality of sub-regions are arranged in different directions or perpendicular to one another.

9. The apparatus of claim 1, wherein the plurality of sub-regions comprises at least four sub-regions arranged in a pattern.

10. The apparatus of claim 1, wherein at least one of the plurality of sub-regions is shaped as a defined geometric figure or pattern.

11. The apparatus of claim 1, wherein at least one of the plurality of sub-regions is at least partially encompassed or surrounded by at least another one of the plurality of sub-regions.

12. The apparatus of claim 1, wherein the irradiation device is configured to guide the plurality of energy beams along a corresponding plurality of beam paths, wherein the plurality of beam paths comprise at least one component perpendicular or parallel to the transition or the border between respective ones of the plurality of sub-regions.

13. The apparatus of claim 1, wherein the plurality of sub-regions differ in respect of an optical parameter.

14. A method of calibrating an apparatus for additively manufacturing three-dimensional objects, the method comprising:
   guiding a plurality of energy beams generated by at least one irradiation device across at least one calibration unit, the at least one calibration unit comprising at least one calibration region arranged in a beam guiding plane, wherein the at least one calibration region comprises a plurality of sub-regions differing in respect of at least one optical property;
   determining with a determination device, a plurality of calibration signals generated by the plurality of sub-regions being irradiated with the plurality of energy beams;
   determining with the determination device, a calibration status of the irradiation device based at least in part on the determined plurality of calibration signals, wherein the plurality of energy beams comprises a first energy beam and a second energy beam, and wherein the plurality of sub-regions comprises a first sub-region and a second sub-region wherein a border defines a transition between the first sub-region and the second sub-region, and wherein the plurality of calibration signals comprises a first calibration signal, a second calibration signal, a third calibration signal, and a fourth calibration signal;
   scanning the first energy beam across a first beam path in the first sub-region and across the border to the second sub-region, generating the first calibration signal corresponding to the first energy beam scanning the first sub-region and generating the second calibration signal corresponding to the first energy beam scanning the second sub-region, and scanning the second energy beam along a second beam path in the first sub-region and across the border to the second sub-region, generating the third calibration signal corresponding to the second energy beam scanning the first sub-region and generating the fourth calibration signal corresponding to the second energy beam scanning the second sub-region;
   generating a first calibration data based on a ratio of the first calibration signal to the second calibration signal, and generating a second calibration data based on a ratio of the third calibration signal to the fourth calibration signal; and
   comparing the first calibration data to the second calibration data to determine the calibration status.

15. The method of claim 14, comprising:
   calibrating the apparatus based at least in part on the determined calibration status.

16. The method of claim 14, wherein the first calibration signal comprises a first intensity signal and the second calibration signal comprises a second intensity signal.

17. The method of claim 14, comprising:
   chronologically resolving and/or spatially resolving the first calibration signal and/or the second calibration signal.

18. A non-transitory computer-readable medium comprising computer-executable instructions, which when executed by a processor associated with an apparatus for additively manufacturing three-dimensional objects, causes the apparatus to perform a method comprising:
   guiding a plurality of energy beams generated by at least one irradiation device across at least one calibration unit, the at least one calibration unit comprising at least one calibration region arranged in a beam guiding plane, wherein the at least one calibration region comprises a plurality of sub-regions differing in respect of at least one optical property;
   determining with a determination device, a plurality of calibration signals generated by the plurality of sub-regions being irradiated with the plurality of energy beams;
   determining with the determination device, a calibration status of the irradiation device based at least in part on the determined plurality of calibration signals, wherein the plurality of energy beams comprises a first energy beam and a second energy beam, and wherein the plurality of sub-regions comprises a first sub-region and a second sub-region wherein a border defines a transition between the first sub-region and the second sub-region, and wherein the plurality of calibration signals comprises a first calibration signal, a second calibration signal, a third calibration signal, and a fourth calibration signal;
   scanning the first energy beam across a first beam path in the first sub-region and across the border to the second sub-region, generating the first calibration signal corresponding to the first energy beam scanning the first sub-region and generating the second calibration signal corresponding to the first energy beam scanning the second sub-region, and scanning the second energy beam along a second beam path in the first sub-region and across the border to the second sub-region, generating the third calibration signal corresponding to the second energy beam scanning the first sub-region and generating the fourth calibration signal corresponding to the second energy beam scanning the second sub-region;
   generating a first calibration data based on a ratio of the first calibration signal to the second calibration signal, and generating a second calibration data based on a ratio of the third calibration signal to the fourth calibration signal; and
   comparing the first calibration data to the second calibration data to determine the calibration status.

19. The non-transitory computer-readable medium of claim 18, the computer-executable instructions further configured to cause the apparatus to perform the method comprising chronologically resolving and/or spatially resolving the first calibration signal and/or the second calibration signal.

* * * * *